US012786224B2

(12) United States Patent
Lin et al.

(10) Patent No.: US 12,786,224 B2
(45) Date of Patent: Nov. 3, 2026

(54) NETWORK INTRUSION DETECTION USING NODE SIGNIFICANCE ANALYSIS

(71) Applicant: Rapid7, Inc., Boston, MA (US)

(72) Inventors: Wah-Kwan Lin, Melrose, MA (US); Paul Deardorff, San Francisco, CA (US)

(73) Assignee: Rapid7, Inc., Boston, MA (US)

( * ) Notice: Subject to any disclaimer, the term of this patent is extended or adjusted under 35 U.S.C. 154(b) by 84 days.

(21) Appl. No.: 18/823,756

(22) Filed: Sep. 4, 2024

(65) Prior Publication Data

US 2024/0430292 A1 Dec. 26, 2024

Related U.S. Application Data

(63) Continuation of application No. 17/512,753, filed on Oct. 28, 2021, now Pat. No. 12,113,822.

(51) Int. Cl.
*H04L 9/40* (2022.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 2018/0137588 | A1 | 5/2018 | Kenthapadi | |
| 2018/0197128 | A1* | 7/2018 | Carstens | G06F 16/9024 |
| 2019/0132224 | A1 | 5/2019 | Verma et al. | |
| 2020/0195673 | A1* | 6/2020 | Lee | H04L 45/70 |
| 2020/0244673 | A1* | 7/2020 | Stockdale | G06N 20/00 |
| 2022/0004826 | A1 | 1/2022 | Mutalikdesai et al. | |
| 2022/0337617 | A1 | 10/2022 | Basovskiy et al. | |

* cited by examiner

*Primary Examiner* — Joe Chacko
(74) *Attorney, Agent, or Firm* — Ashwin Anand

(57) ABSTRACT

Various embodiments include systems and methods to implement a graph analysis-based assessment to determine relative node significance. Network traffic data associated with a network may be obtained. A graph analysis-based assessment of the network may be performed to determine network traffic paths between a plurality of nodes in the network based at least in part on the network traffic data and to calculate, for each node and based at least in part on the network traffic paths, a respective centrality value. The respective centrality value may be indicative of a respective node being a potential source of disruption to the network relative to other nodes. At least one significant node in the network may be identified based at least in part on the centrality values, and a particular action to be performed with respect to the at least one significant node may be determined.

20 Claims, 6 Drawing Sheets

NETWORK INTRUSION DETECTION USING NODE SIGNIFICANCE ANALYSIS

CROSS-REFERENCE TO RELATED APPLICATIONS

This Application claims priority under 35 U.S.C. § 120 and is a continuation of U.S. patent application Ser. No. 17/512,753, filed Oct. 28, 2021, titled "NETWORK INTRUSION DETECTION USING NODE SIGNIFICANCE ANALYSIS," the entire contents of which are incorporated herein by reference in its entirety.

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

Organization networks can be highly complex, and it may be difficult to identify assets that are important to monitor and manage for the purpose of improving security. Conventional approaches to identifying important assets of an organization may involve performing a self-assessment inventory of what assets are considered important to the organization. Such a self-assessment inventory may rely on human inputs, such as interviewing key stakeholders in the organization (e.g., from departments such as research and development, finance, accounting, marketing, executive leadership, etc.) to determine what those stakeholders consider to be important and what key systems impact the functions of their business segments. Accordingly, there is a need for improved systems and methods of identifying assets for vulnerability management.

SUMMARY OF EMBODIMENTS

The systems and methods described herein may be employed in various combinations and in embodiments to implement a graph analysis-based assessment to determine relative node significance. In the present disclosure, one or more hardware processors may be configured to obtain network traffic data associated with a network and to perform a graph analysis-based assessment of the network. To perform the graph analysis-based assessment, network traffic paths between a plurality of nodes in the network may be determined based at least in part on the network traffic data. For each node of the plurality of nodes and based at least in part on the network traffic paths, a respective centrality value may be calculated. The respective centrality value may be indicative of a respective node being a potential source of disruption to the network relative to other nodes of the plurality of nodes. At least one significant node in the network may be identified based at least in part on the centrality values, and a particular action to be performed with respect to the at least one significant node may be determined. In contrast to conventional approaches that rely on human inputs to identify important assets of an organization, the present disclosure utilizes objectively observable network structures and flows to identify particular assets that have a relatively high disruption potential for the organization.

Figure 1:
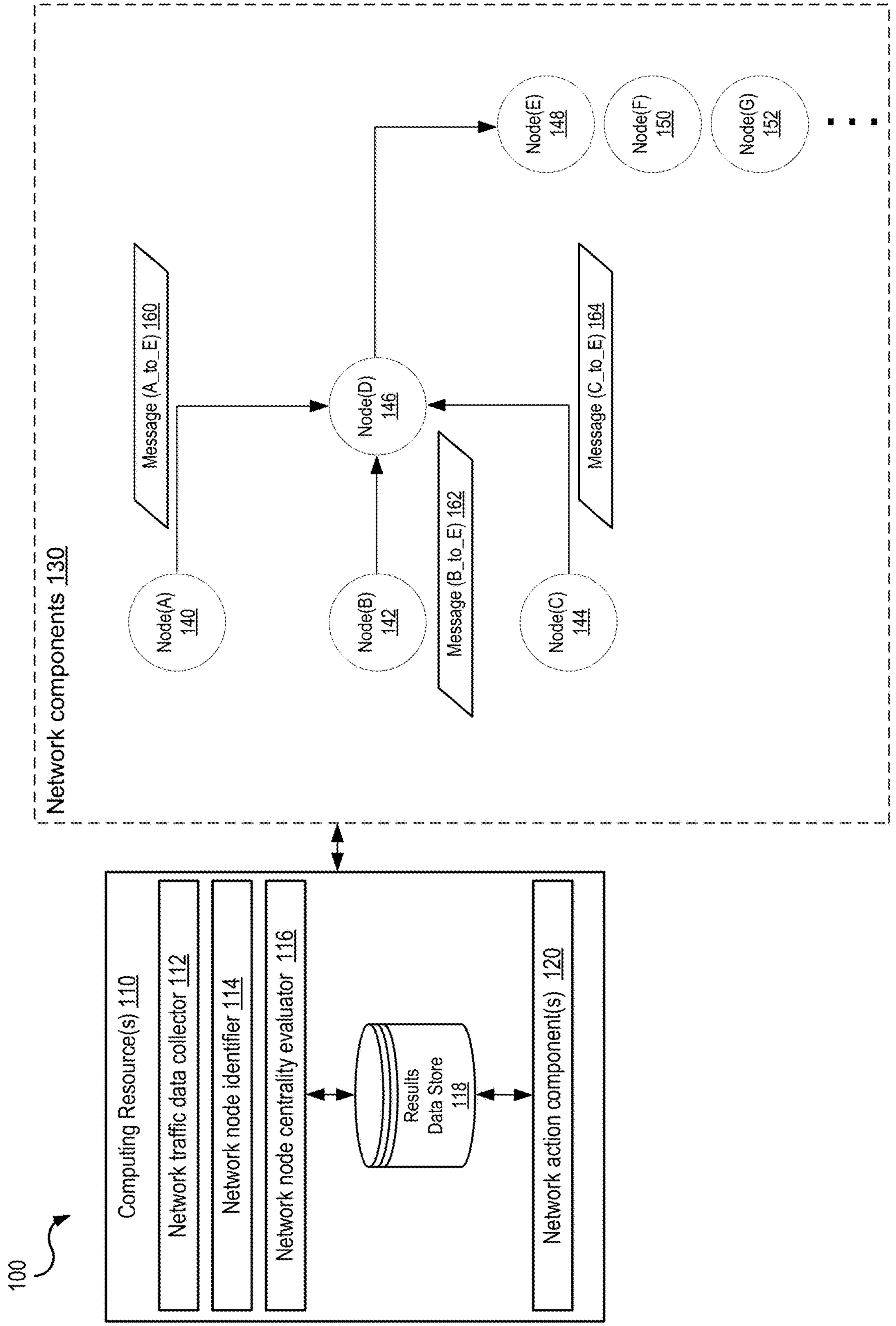
FIG. 1 is a block diagram illustrating an example system that implements a graph analysis-based assessment to determine relative node significance, in accordance with some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of utilizing one or more graph analysis techniques to identify relative criticality of individual nodes within an organization's network based primarily on paths of network traffic. Each node can be characterized by different levels of criticality for the overall organization. Disruption of critical nodes (also referred to colloquially as "crown jewels") could result in operational disruptions or heightened risk to the organization. The most critical nodes may be analogous to "choke points" in that their disruption could potentially have a significant negative impact on the overall organization.

The present disclosure defines a "choke point" in a network as a significant node in the network structure that ties one or more nodes together. Such nodes are important to the network in that they route traffic and, if disturbed, can result in a degradation of network performance to the point where the network as a whole fails to perform. Such a choke point may represent a desirable target for malicious actors. A choke point could be useful to perform reconnaissance or monitoring because it has a great vantage point into all the traffic that flows through it. For these reasons, it is important to identify such choke points within a network in order to both understand and defend them.

In graph analysis, for nodes in a graph structure, such choke points can be identified as nodes with a relatively high centrality value. That is, a particular node with a centrality value that is relatively high compared to centrality values of other nodes in a network may be indicative of the particular node being a "significant" node of the network that is a potential source of disruption to the network relative to the other nodes of the network. One example of such a centrality value is referred to as a "betweenness" centrality value, in which theoretical "lines" may be drawn between all nodes of an organization's network, and the betweenness centrality corresponds to how many of those lines pass through a particular node to reach other nodes. From the perspective of an attacker, a node with a high betweenness centrality may be particularly attractive as it may be indicative of a large amount of information passing through that node. Accordingly, such a node could potentially be a rich source of intelligence for the attacker. Alternatively, an attacker with more nefarious intent (such as the intent to bring down an organization's entire network) could potentially cause significant disruption to the internal operation of the organization's network if the attacker were able to bring down such a node. For those reasons, based on how much intelligence passes through such a node and how critical such a node is to the overall network infrastructure, then such a node may be considered a "crown jewel" to the overall network structure. As used herein, the term "crown jewel" refers to a significant node in the network that is determined to have a relatively high disruption potential based on a relatively high centrality value (such as a relatively high "betweenness" centrality value). As described further herein, other examples of centrality values may include: an "undirected" centrality value; an "in-degree" centrality value; an "out-degree" centrality value; or an "Eigenvector" centrality value (among other possibilities). In each case, such centrality values represent quantifiable metrics that may be indicative of whether a given node is a significant node having a relatively high disruption potential and thus a relatively high potential to be targeted by an attacker.

Once such centrality values are calculated, the results can be persisted in a data store, such as a database. This stored data can be used to create rules for each asset or node within the network. The rules may assign a score to the importance of each asset and dictate various thresholds to guide patching policies, access controls, and identification of suspicious behavior by security and information technology (IT) teams. According to some embodiments, the rules (also referred to herein as "rulesets") may be adaptive because the process observes and analyzes the network itself. Conventional vulnerability management or intrusion detection systems have static rulesets that may quickly become outdated when devices are added or removed or change functions. By contrast, with the systems and methods of the present disclosure, as the network structure changes, the rulesets could be automatically updated without human intervention, according to some embodiments. Alternatively, in some embodiments, new ruleset suggestions/changes could be presented to a user via a user interface (not shown in FIG. 1), and the user could accept or reject such suggestions/changes via the user interface.

Thus, the approaches described in the present disclosure are intrinsically distinct from conventional attempts to prioritize nodes or assets for IT or security remediation, as the present disclosure focuses more on the network structure rather than on the characteristics of any given node in isolation. The approaches described in the present disclosure can feasibly be used to assess nodes on a network that are not actively monitored, such as assets without agents. Instead of directly observing a node for vulnerabilities or odd behaviors, the node can be indirectly observed based on surrounding and traversing network traffic to assess a given node's security or risk attributes.

The approaches described in the present disclosure may potentially be utilized to inform and enhance a variety of product and service offerings, including but not limited to: vulnerability management, behavior analysis, network traffic analysis, and security orchestration and automation, among other possibilities. The approaches described in the present disclosure may potentially be useful for organizations that operate networks or that serve organizations that operate networks. For example, the approaches described in the present disclosure may be useful for organizations that provide firewall solutions, intrusion detection system (IDS) solutions, patching solutions, and vulnerability management solutions, among other possibilities.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements a graph analysis-based assessment to determine relative node significance, in accordance with some embodiments. In contrast to conventional approaches that rely on human inputs to identify important assets of an organization, the system 100 of FIG. 1 may utilize objectively observable network structures and flows to identify particular assets that have a relatively high disruption potential for the organization.

Figure 6:
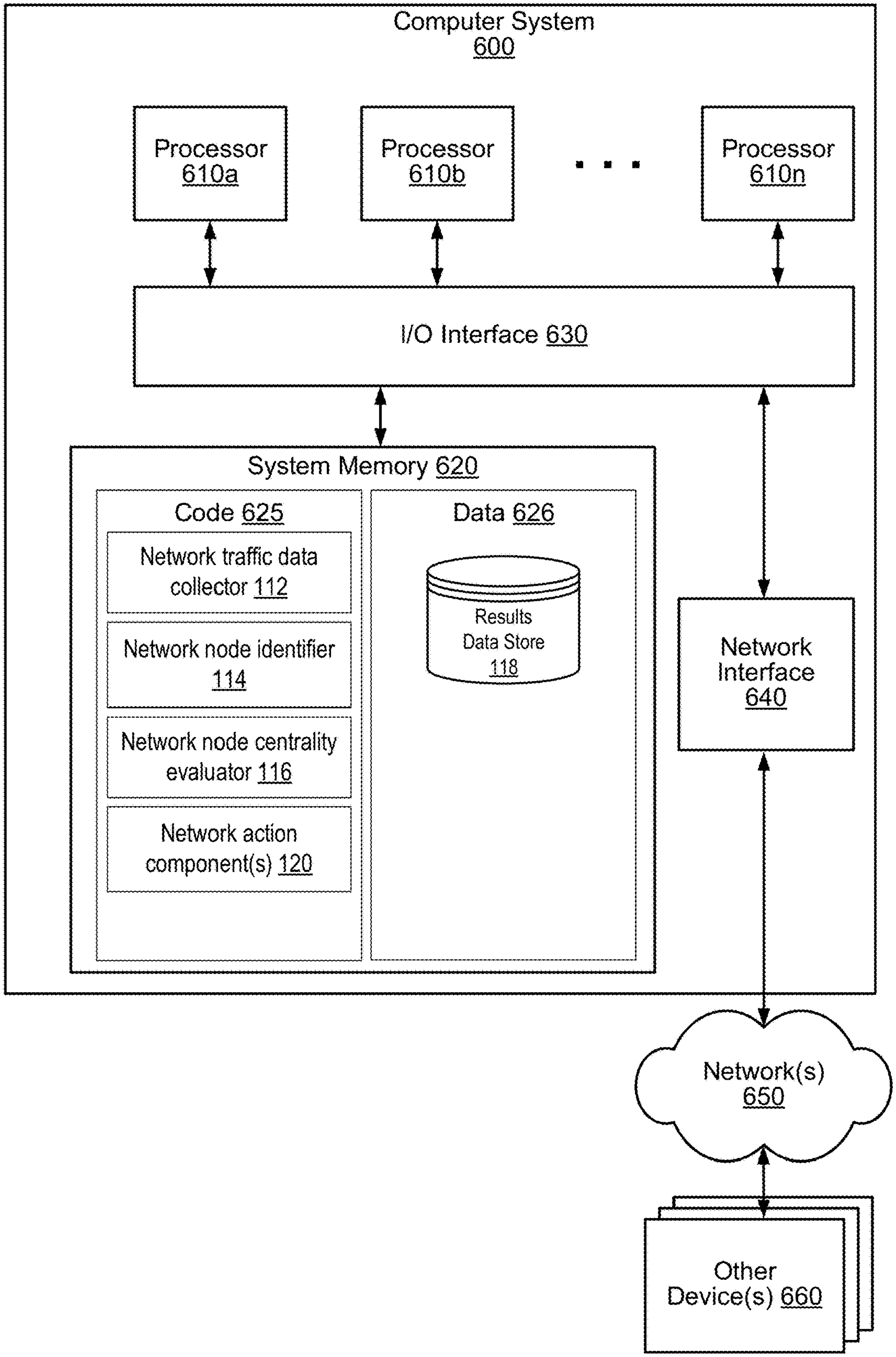
FIG. 6 is a block diagram illustrating an example computer system that may be used to implement one or more portions of a system that implements a graph analysis-based assessment to determine relative node significance, according to some embodiments.

FIG. 1 depicts one or more computing resources 110, which may include one or more hardware processors with associated memory (not shown, see e.g., FIG. 6). The computing resource(s) 110 may be configured to implement a graph analysis-based assessment to determine relative node significance.

According to some embodiments, FIG. 1 illustrates that a network traffic data collector 112 may be configured to collect or otherwise obtain network traffic data associated with a network of an organization. In some embodiments, one or more network sensors (not shown in FIG. 1) may be utilized to collect or otherwise obtain the network traffic data to be provided to the network traffic data collector 112. According to some embodiments, FIG. 1 illustrates that a network node identifier 114 may be configured to identify each component of the network as a distinct node of the network.

According to some embodiments, FIG. 1 illustrates that a network node centrality evaluator 116 may be configured to perform a graph analysis-based assessment of the network. To perform the graph analysis-based assessment of the network, the network node centrality evaluator 116 may be configured to determine, based at least in part on the network traffic data from the network traffic data collector 112, network traffic paths between a plurality of nodes in the network. To perform the graph analysis-based assessment of the network, the network node centrality evaluator 116 may be configured to calculate one or more centrality values for each distinct node of a plurality of nodes of the network. That is, the network node centrality evaluator 116 may be configured to calculate, for each node of the plurality of nodes and based at least in part on the network traffic paths, a respective centrality value (or values) indicative of a respective node being a potential source of disruption to the network relative to other nodes of the plurality of nodes. According to some embodiments, FIG. 1 illustrates that the results of the graph analysis-based assessment performed by the network node centrality evaluator 116, including at least the calculated centrality values, may be persisted in a results data store 118. The network node centrality evaluator 116 may be further configured to identify, based at least in part on the centrality values stored in the results data store 118, at least one significant node in the network (which may also be persisted in the results data store 118).

According to some embodiments, FIG. 1 illustrates that one or more network action components 120 may be configured to determine a particular action (or actions) to be performed with respect to the at least one significant node identified in the network. Illustrative, non-limiting examples of such actions to be performed, as further described herein, may include: prioritizing patching or monitoring of the significant node(s); establishing alert mechanisms to trigger when particular conditions are satisfied for the significant node(s); informing changes to the network structure; or informing intrusion detection systems of where to focus particular attention.

FIG. 1 illustrates that various network components 130 may be associated with a network structure of a particular organization's network. The network traffic data collector 112 may be configured to identify such components based on network traffic data associated with the network that is collected or otherwise obtained by network traffic data collector 112. According to some embodiments, the network traffic data associated with the particular organization's network may be stored in a network traffic data store (not shown in FIG. 1). The network components 130 may include such devices as workstations, routers, firewalls, data stores, or other device(s) networked within an organization's IT infrastructure, according to some embodiments. The network node identifier 114 may be configured to identify each individual component of the network components 130 depicted in FIG. 1 as a distinct node of the organization's network. Thus, as used herein, the terms "node" or "network node" refer to any asset or resource through which network activity may pass. As described herein, each node can be characterized by different levels of criticality/significance for the overall organization.

For illustrative purposes, FIG. 1 depicts an example in which the network components 130 include at least: Node (A) 140; Node(B) 142; Node(C) 144; Node(D) 146; Node (E) 148; Node(F) 150; and Node(G) 152. FIG. 1 further illustrates, via dashed lines that the network components 130 may include additional nodes, in some cases. It will be appreciated that the example depicted in FIG. 1 is for illustrative purposes only and that an alternative number and/or arrangement of network components/nodes may be present in a given organization's network.

The network node centrality evaluator 116 may utilize one or more graph analysis techniques to identify one or more centrality values for each of the nodes. By utilizing the one or more graph analysis techniques, the network node centrality evaluator 116 may be configured to identify a particular node with a relatively high centrality value as a potential "choke point" whose disruption could potentially have a significant negative impact on the overall organization. That is, the particular node may have a calculated centrality value that is indicative of the particular node being a potential source of disruption to the network relative to other nodes of the network.

FIG. 1 depicts an example in which the network node centrality evaluator 116 may utilize a graph analysis technique to identify a choke point as a node with a relatively high "betweenness" centrality value. Such a "betweenness" centrality value represents a measure of the number of shortest paths that traverse through a given node to be able to reach another node. By way of example, FIG. 1 illustrates a scenario in which Node(A) 140 generates a message 160 (identified as "Message (A_to_E)" in FIG. 1) to be communicated to Node(E) 148. FIG. 1 further illustrates a scenario in which Node(B) 142 generates a message 162 (identified as "Message (B_to_E)" in FIG. 1) to be communicated to Node(E) 148; and Node(C) 144 generates a message 164 (identified as "Message (C_to_E)" in FIG. 1) to be communicated to Node(E) 148. In the embodiment depicted in FIG. 1, the shortest path for each of the messages 160, 162, 164 to reach Node(E) 148 includes traversing Node(D) 146. In this case, Node(D) 146 has a "betweenness" centrality value of three, in this simplified example.

Note that this particular betweenness centrality approach strictly assesses criticality based on network traffic paths. This approach does not account for such attributes or weightings as: intrinsic attributes of a given node (such as who uses the node, the type of node, or installed applications); intrinsic attributes of peer nodes that are connected to a given node; and/or attributes of the edges (or connections) extending from any given node (in effect, every edge is treated equally). Such a simplification of criticality calculation for nodes on a network is beneficial as it significantly reduces computational complexity and assesses criticality from a purely structural perspective of a network.

"Betweenness" centrality is a subset of types of centrality measures. The most generic type of centrality measure is referred to as "undirected" centrality, corresponding to a count of how many components a particular node is connected to. Another type of centrality measure is referred to as "in-degree" centrality, which essentially corresponds to a count of how many components are connected into a particular node. For example, this might correspond to how many components send data packets to the particular node. Another type of centrality measure is referred to as "out-degree" centrality, which essentially corresponds to the reverse of "in-degree" centrality. That is, "out-degree" centrality essentially corresponds to a count of how many components that a particular node sends data packets to. Each of these types of centrality measures may have different security implications. For example, with respect to "in-degree" centrality, such a centrality measure may be representative of how many components have the potential to infect a particular node with malware. As another example, with respect to "out-degree" centrality, such a centrality measure may be representative of the potential "blast radius" in terms of spreading harmful things from a particular node to other components within the organization. To illustrate, if a malicious actor seeks to spread a worm through an organization, the malicious actor may target a particular node having the highest "out-degree" centrality. Another type of centrality measure is referred to as "Eigenvector" centrality, which represents a secondary measure such as the importance of other nodes that a particular node is connected to. To illustrate, it may be possible for a malicious actor to damage the particular node such that it impacts important nodes that the particular node is connected to, thereby indirectly causing significant harm. In this case, from a security practitioner's standpoint, it may be prudent to "harden" this particular node that may otherwise seem innocuous based on other measures.

FIG. 1 illustrates that the network node centrality evaluator 116 may store at least the one or more calculated centrality values in the results data store 118. According to some embodiments, the one or more centrality values stored in the results data store 118 may be utilized to create rules for each asset or node within the organization's network. To illustrate, in some cases, the rules may assign a score to the importance of each asset and dictate various thresholds to guide patching policies, access controls, and identification of suspicious behavior by security and IT teams.

The network action component(s) 120 may be configured to perform one or more actions based at least in part on information obtained from the results data store 118. As an example, once critical/significant nodes on a network are identified based on the network structure and criticality calculations based on one or more centrality values (e.g., a betweenness centrality value, among other alternatives), the network action component(s) 120 may utilize such information to inform particular actions. As an example, according to some embodiments, the network action component(s) 120 may utilize such information to prioritize patching or monitoring of the critical nodes, particularly in cases of IT resource limitations.

Prioritization of patching or monitoring of the critical/significant nodes may be a reflection of risk management in general. That is, prioritization may be important due to finite, limited resources of an organization. As an example, a particular node with the highest quantified betweenness centrality may be prioritized for patching to provide the greatest benefit possible with such finite, limited resources. As another example, the approaches described in the present disclosure could also be utilized for work prioritization. To illustrate, a quantified centrality value may be utilized in combination with a qualitative attribute to identify nodes that should not be taken offline at a particular time, such as during business hours (e.g., delaying patching of a router until Saturday night). As another example, the approaches described in the present disclosure could also factor in the type of information that passes through a particular node, such as financial information versus less sensitive information.

As another example, according to some embodiments, the network action component(s) 120 may utilize such information to establish alert mechanisms on critical/significant nodes to trigger when particular conditions are satisfied, such as a sudden increase in network traffic passing through a given critical/significant node. According to some embodiments, a user experience (UX) or user interface (UI) implementation may enable a user to configure alert mechanisms, such as enabling the user to define when an alert should trigger. As illustrative, non-limiting examples, the user may configure an alert mechanism to trigger an alert responsive to a betweenness centrality value of any one node exceeding a threshold value (e.g., a betweenness centrality value of one-hundred) or to trigger an alert responsive to a percentage of graph density exceeding a threshold percentage (e.g., ten percent). Alternatively, the alert mechanism may be more conditional, such as triggering an alert responsive to a new path being created that introduces someone from marketing into critical production systems.

As another example, according to some embodiments, the network action component(s) 120 may utilize such information to inform changes to the network structure to modify the criticality of particular node(s) or sections of the network as a whole, such as by imposing stricter network segmentation or by introducing additional firewalls along particular traffic flow paths. As yet another example, according to some embodiments, the network action component(s) 120 may utilize such information to inform an intrusion detection system (IDS) of where to focus particular attention.

Thus, FIG. 1 illustrates an example system that implements a graph analysis-based assessment to determine relative node significance. In contrast to conventional approaches that rely on human inputs to identify important assets of an organization, the example system depicted in FIG. 1 utilizes objectively observable network structures and flows to identify particular assets that have a relatively high disruption potential for the organization.

Figure 2:
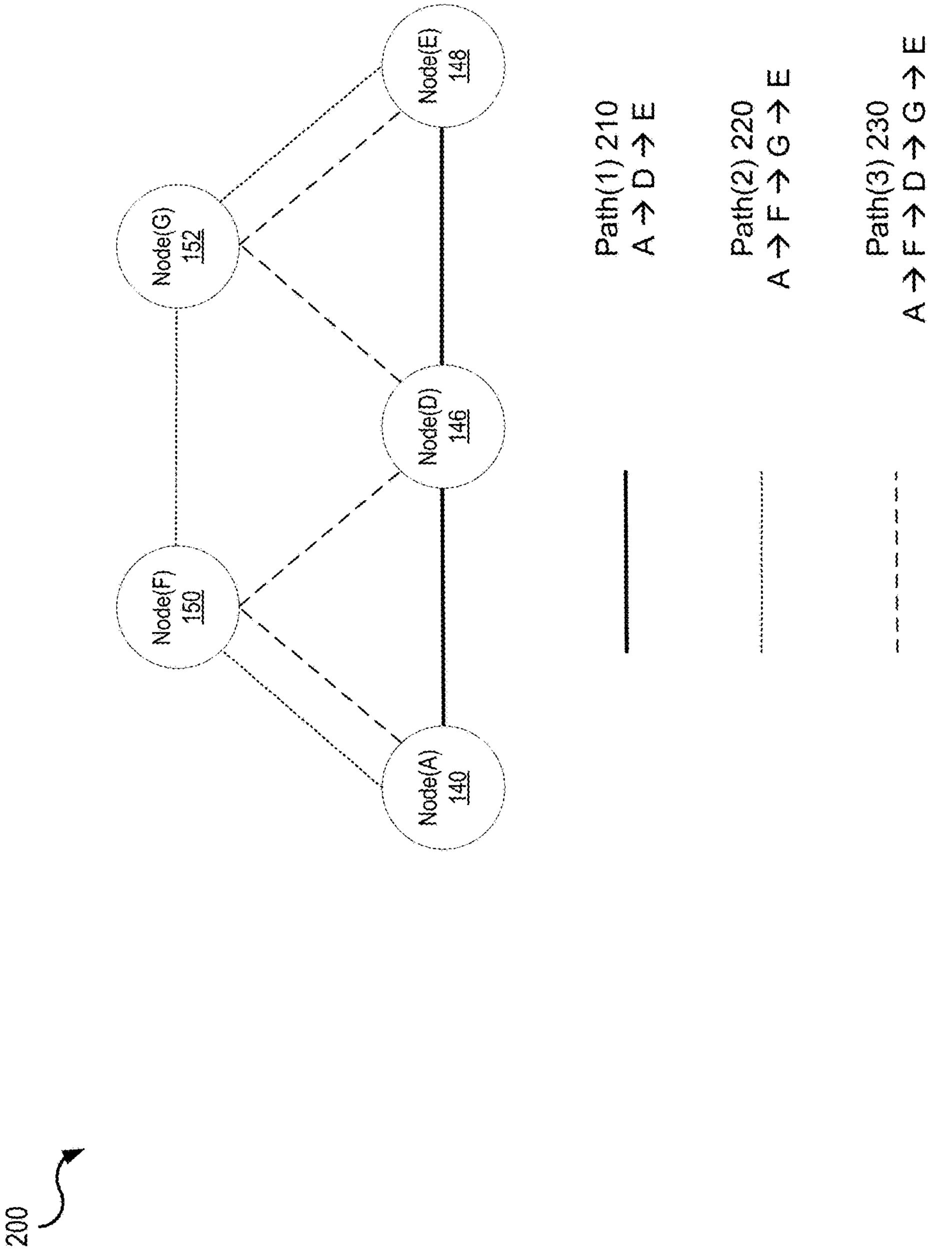
FIG. 2 is a block diagram illustrating an example process of determining network traffic paths between a plurality of nodes in a network as part of a graph analysis-based assessment to determine relative node significance, in accordance with some embodiments.

FIG. 2 is a block diagram 200 that illustrates an example process of determining network traffic paths between a plurality of nodes in a network as part of a graph analysis-based assessment to determine relative node significance, in accordance with some embodiments.

FIG. 2 illustrates an example of a calculation of a "shortest path" between particular nodes of an organization's network, according to some embodiments. To illustrate, a "shortest path" determination may correspond to an evaluation of various alternative paths for sending data from Node(A) 140 to Node(E) 148.

FIG. 2 illustrates that a first path 210 (identified as "Path(1)" in FIG. 2 and depicted via solid lines) corresponds to a hypothetical path in which data passes from Node(A) 140 to an edge node, corresponding to Node(D) 146. Data then passes from Node(D) 146 to a next edge node, corresponding to Node(E) 148. Thus, the first path 210 depicted in FIG. 2 corresponds to a hypothetical path that includes two edge nodes associated with data transfer from Node(A) 140 to Node(E) 148.

FIG. 2 illustrates that a second path 220 (identified as "Path(1)" in FIG. 2 and depicted via a first set of dashed lines) corresponds to another hypothetical path in which data passes from Node(A) 140 to an edge node, corresponding to Node(F) 150. Data then passes from Node(F) 150 to a next edge node, corresponding to Node(G) 152. Data then passes from Node(G) 152 to a next edge node, corresponding to Node(E) 148. Thus, the second path 220 depicted in FIG. 2 corresponds to a hypothetical path that includes three edge nodes associated with data transfer from Node(A) 140 to Node(E) 148.

FIG. 2 illustrates that a third path 230 (identified as "Path(3)" in FIG. 2 and depicted via a second set of dashed lines) corresponds to another hypothetical path in which data passes from Node(A) 140 to an edge node, corresponding to Node(F) 150. Data then passes from Node(F) 150 to a next edge node, corresponding to Node(D) 146. Data then passes from Node(D) 152 to a next edge node, corresponding to Node(G) 152. Data then passes from Node(G) 152 to a next edge node, corresponding to Node(E) 148. Thus, the third path 230 depicted in FIG. 2 corresponds to a hypothetical path that includes four edge nodes associated with data transfer from Node(A) 140 to Node(E) 148.

Thus, FIG. 2 illustrates an example process of determining network traffic paths between a plurality of nodes in a network as part of a graph analysis-based assessment to determine relative node significance. In FIG. 2, the calculated shortest paths may be utilized in the context of a graph analysis-based assessment that is based on "betweenness" centrality values.

Figure 3:
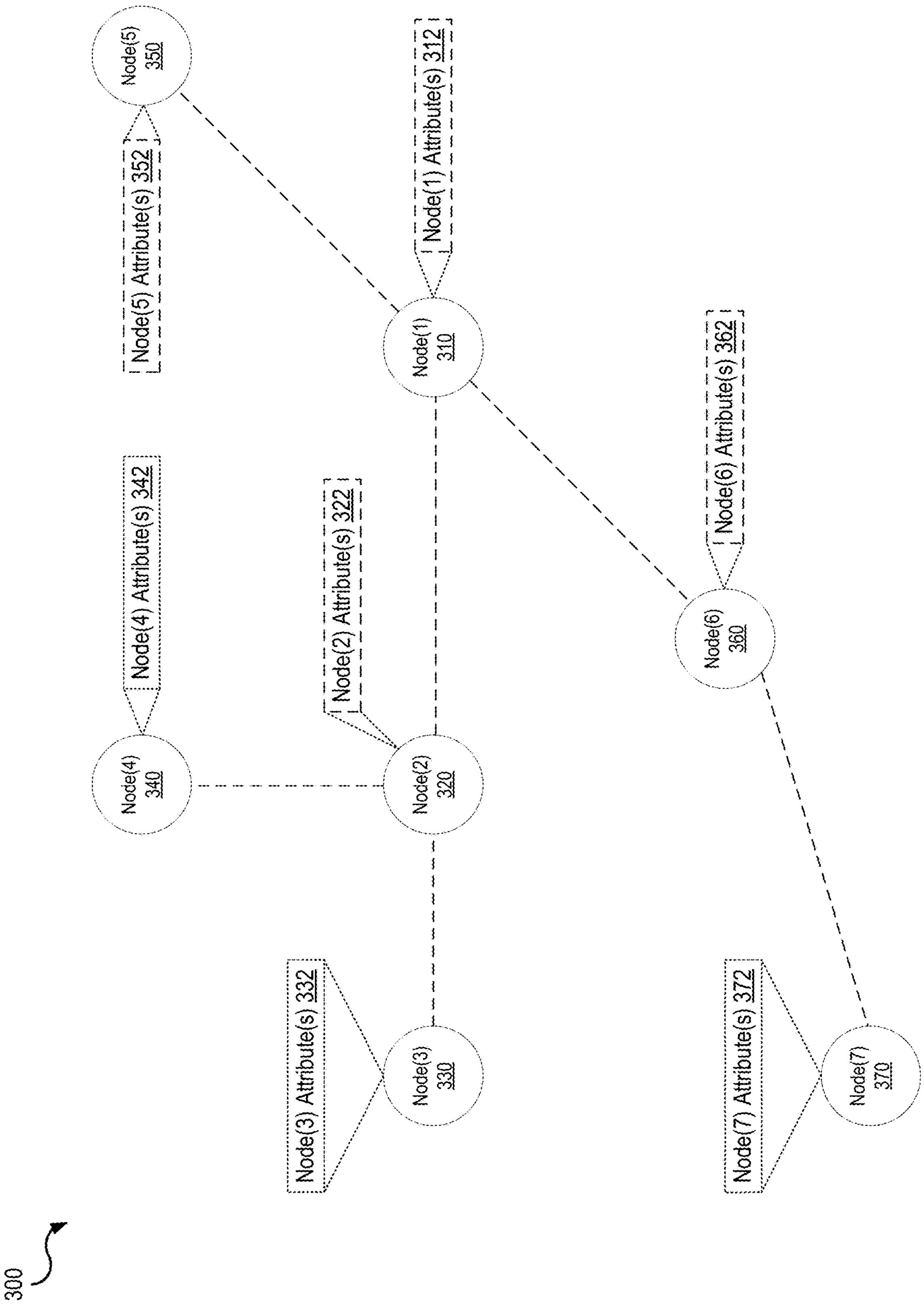
FIG. 3 is a block diagram illustrating an example process of identifying at least one significant node in a network as part of a graph analysis-based assessment to determine relative node significance, in accordance with some embodiments.

FIG. 3 is a block diagram 300 illustrating an example process of identifying at least one significant node in a network as part of a graph analysis-based assessment to determine relative node significance, in accordance with some embodiments. FIG. 3 illustrates that a combination of quantitative centrality value(s) and qualitative node attribute(s) may be utilized, according to some embodiments.

FIG. 3 illustrates an example of a plurality of nodes, with each individual node having its own set of one or more node attributes. In the particular embodiment depicted in FIG. 3, the plurality of nodes include: a first node 310 having first attribute(s) 312; a second node 320 having second attribute(s) 322; a third node 330 having third attribute(s) 332; a fourth node 340 having fourth attribute(s) 342; a fifth node 350 having fifth attribute(s) 352; a sixth node 360 having sixth attribute(s) 362; and a seventh node 370 having seventh attribute(s) 372. It will be appreciated that the example depicted in FIG. 3 is for illustrative purposes only and that an alternative number and/or arrangement of nodes and/or associated attributes may be possible.

FIG. 3 illustrates that, optionally, the centrality analysis (e.g., a betweenness centrality analysis) can be premised on assessing nodes based on network connections to other nodes according to defined attributes. As an illustrative, non-limiting example, a filter can be defined to only assess nodes that have some path that leads to or through a node in the finance department. In such an operation, the analysis can clearly define the most likely vectors through which a malicious action targeted at the finance department can be initiated from.

Thus, FIG. 3 is designed to illustrate the combination of quantitative and quality details. According to some embodiments, nodes can be identified individually based on their attributes (example, finance node or IT node or C-suite node). Those would be departmental attributes. There could also be device label attributes (e.g., device type, operating system, hardware architecture, etc.), such as a device with a Mac® operating system versus device with a Windows® or a Linux® operating system. Alternatively or additionally, the individual node attributes could include additional details, such as identifying an individual node as a particular type of device (e.g., a database, a router, a firewall, or an Internet-of-Things (IoT) webcam, among numerous other alternatives). In some cases, a filter could be applied based on various attributes. As an illustrative, non-limiting example, a filter may be defined with criteria such as only identifying nodes of Windows® developers with access to production code. For a particular subset of nodes satisfying such criteria, individual centrality values (e.g., betweenness centrality values) may be determined for only the particular subset of nodes, and the significant node determination may be limited based on that subset of individual centrality values (rather than all of the nodes 310, 320, 330, 340, 350, 360, 370).

Thus, FIG. 3 illustrates an example process of identifying at least one significant node in a network as part of a graph analysis-based assessment to determine relative node significance. FIG. 3 illustrates that a combination of quantitative centrality value(s) and qualitative node attribute(s) may be utilized, according to some embodiments.

Figure 4:
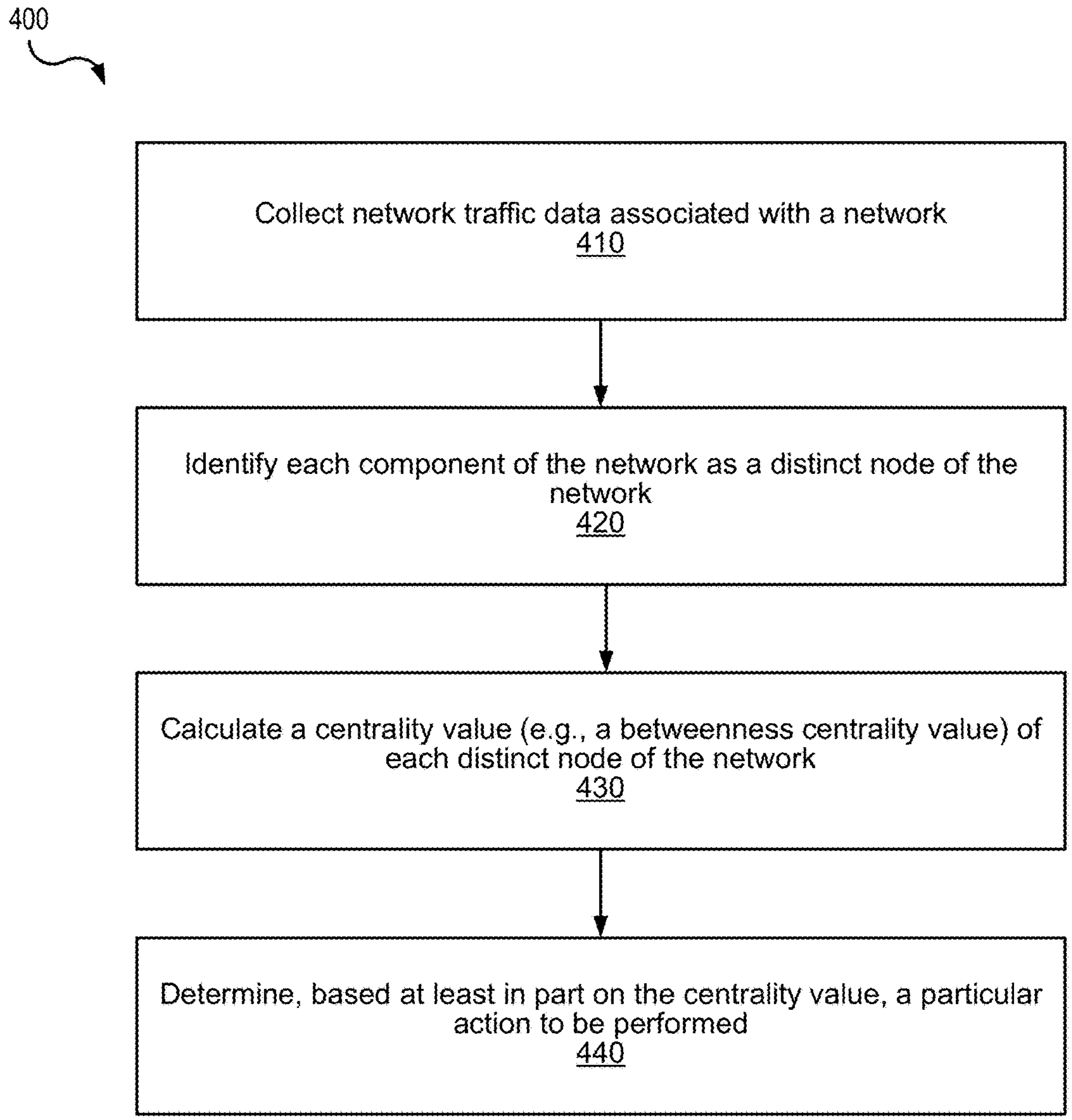
FIG. 4 is a flowchart that illustrates an example process of determining a particular action to be performed for a node identified as a significant node in a network as part of a graph analysis-based assessment to determine relative node significance, according to some embodiments.

FIG. 4 is a flowchart 400 that illustrates an example of a process of determining a particular action to be performed for a node identified as a significant node in a network as part of a graph analysis-based assessment to determine relative node significance, according to some embodiments. In FIG. 4, one or more hardware processors may be utilized to implement the graph analysis-based assessment to determine relative node significance.

At operation 410, the process includes collecting network traffic data associated with a network. For example, the network traffic data collector 112 of FIG. 1 may collect (or otherwise obtain) network traffic data associated with the network components 130 of an organization's network.

At operation 420, the process includes identifying each component of the network as a distinct node of the network. Components can include such devices as workstations, routers, firewalls, data stores, or other device(s) that is networked within an organization's IT infrastructure. For example, the network node identifier 114 of FIG. 1 may identify each of the network components 130 as a distinct node of the organization's network. To illustrate, in the example depicted in FIG. 1, the nodes identified by the network node identifier 114 include at least: Node(A) 140; Node(B) 142; Node(C) 144; Node(D) 146; Node(E) 148; Node(F) 150; and Node(G) 152.

At operation 430, the process includes calculating a centrality value of each distinct node of the network. For example, the centrality value may correspond to a betweenness centrality value, which may be calculated by globally determining the shortest paths between each node (also referred to as "the geodesic") to every other node across the network, then summing the number of such shortest paths that cross over each node, and then further dividing the sum of shortest paths over each node by the global count of all shortest paths in the network. Such a calculation may provide a relative value of how essential a given node is to the total flow of traffic over the network. For example, FIG. 2 depicts an illustrative example of determining a "shortest path" (i.e., the first path 210) for the simplified case of data transfer from Node(A) 140 to Node(E) 148. It will be appreciated that similar calculations may be performed for each distinct node of a given network. Referring to FIG. 1, the network node centrality evaluator 116 may perform such calculations and store the resulting information in the results data store 118.

At operation 440, the process includes determining a particular action to be performed based at least in part on the centrality value. For example, referring to FIG. 1, the network action component(s) 120 may determine a particular action to be performed based at least in part on the centrality value calculated by the network node centrality evaluator 116. As described herein, illustrative, non-limiting examples of actions to be performed may include: prioritizing patching or monitoring of the significant node(s); establishing alert mechanisms to trigger when particular conditions are satisfied for the significant node(s); informing changes to the network structure; or informing intrusion detection systems of where to focus particular attention.

Thus, FIG. 4 illustrates an example of a process of determining a particular action to be performed for a node identified as a significant node in a network as part of a graph analysis-based assessment to determine relative node significance, according to some embodiments. In contrast to conventional approaches that rely on human inputs to identify important assets of an organization, the example process depicted in FIG. 4 utilizes objectively observable network structures and flows to identify particular assets that have a relatively high disruption potential for the organization.

Figure 5:
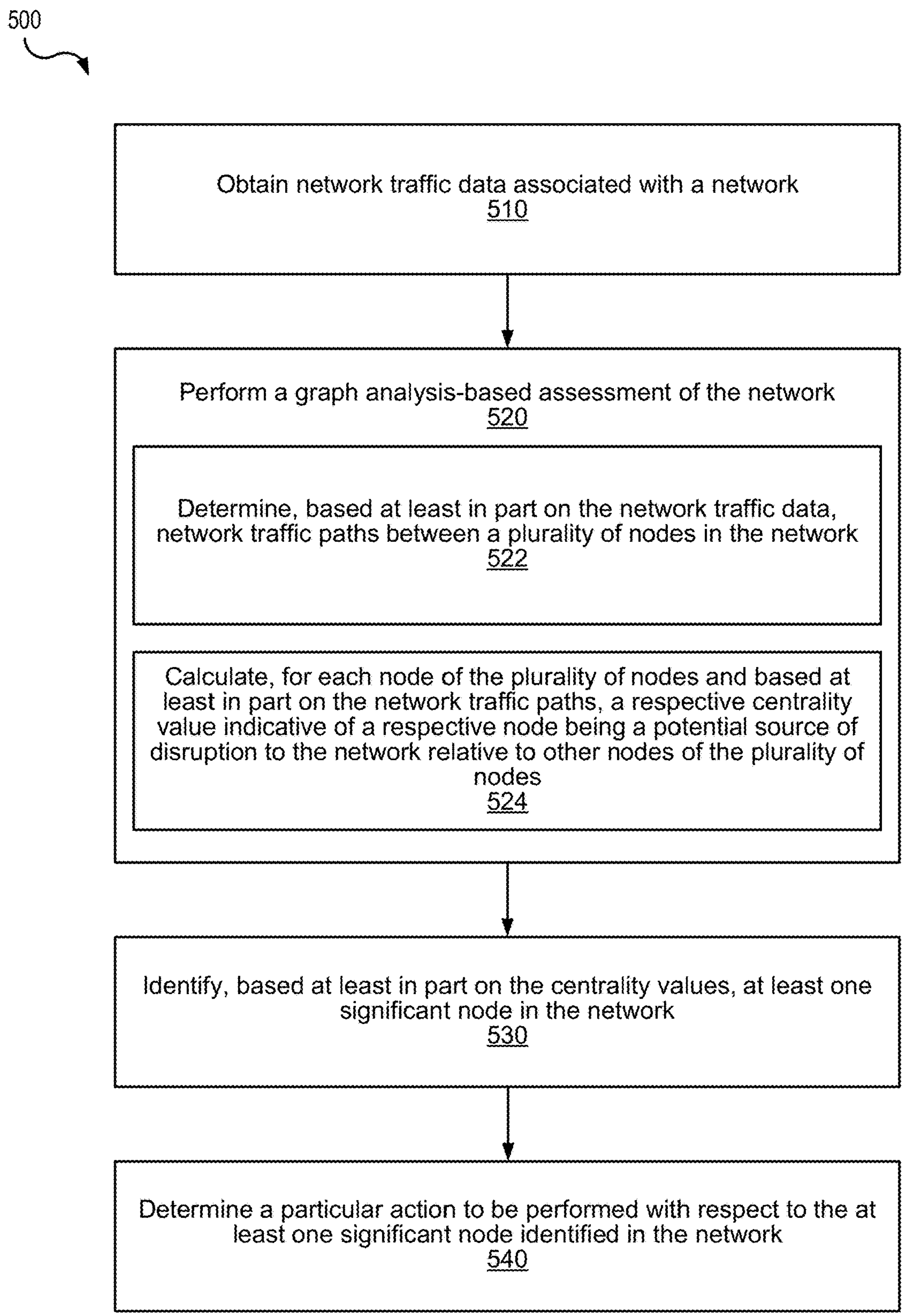
FIG. 5 is a flowchart that illustrates an example process of implementing a graph-analysis based assessment to determine relative node significance, according to some embodiments.

FIG. 5 is a flowchart 500 that illustrates an example of a process of implementing a graph-analysis based assessment to determine relative node significance, according to some embodiments. In FIG. 5, one or more hardware processors may be utilized to implement the graph analysis-based assessment to determine relative node significance.

At operation 510, the process includes obtaining network traffic data associated with a network. For example, referring to FIG. 1, the network traffic data collector 112 may collect (or otherwise obtain) network traffic data associated with the network components 130 of an organization's network.

At operation 520, the process includes performing a graph analysis-based assessment of the network. For example, referring to FIG. 1, the network node identifier 114 may be configured to identify each of the network components 130 as a distinct node of the organization's network, and the network node centrality evaluator 116 may be configured to perform a graph analysis-based assessment based at least in part on information received from the network traffic data collector 112 and information received from the network node identifier 114.

FIG. 5 illustrates that, to perform the graph analysis-based assessment of the network at operation 520, the process may include utilizing one or more hardware processors that are configured to implement operations 522 and 524.

At operation 522, the process includes determining, based at least in part on the network traffic data, network traffic paths between a plurality of nodes in the network. For example, referring to FIG. 1, the network traffic data collector 112 may be utilized in combination with the network node identifier 114 to determine network traffic paths between various nodes of the organization's network. To illustrate, in the example depicted in FIG. 1, the network components 130 that are identified as distinct nodes of the organization's network include at least: Node(A) 140; Node (B) 142; Node(C) 144; Node(D) 146; Node(E) 148; Node(F) 150; and Node(G) 152. The network traffic data collector 112 may be configured to determine, based on network traffic data, network traffic paths between the plurality of nodes in the organization's network. That is, the network traffic data collector 112 may be configured to determine, based on network traffic data, network traffic paths between at least: Node(A) 140; Node(B) 142; Node(C) 144; Node(D) 146; Node(E) 148; Node(F) 150; and Node(G) 152.

At operation 524, the process includes calculating, for each node of the plurality of nodes and based at least in part on the network traffic paths, a respective centrality value indicative of a respective node being a potential source of disruption to the network relative to other nodes of the plurality of nodes. For example, referring to FIG. 1, the network node centrality evaluator 116 may be configured to calculate, for each individual node of the plurality of nodes of the organization's network (e.g., for each of Node(A) 140; Node(B) 142; Node(C) 144; Node(D) 146; Node(E) 148; Node(F) 150; and Node(G) 152) and based at least in part on the network traffic paths (determined by the network traffic data collector 112 in combination with the network node identifier 114), a respective centrality value indicative of a respective node being a potential source of disruption to the network relative to other nodes of the plurality of nodes.

At operation 530, the process includes identifying, based at least in part on the centrality values, at least one significant node in the network. For example, referring to FIG. 1, the network node centrality evaluator 116 may identify, based at least in part on the centrality values calculated for each of the individual nodes of the organization's network (e.g., centrality values calculated for each of Node(A) 140; Node(B) 142; Node(C) 144; Node(D) 146; Node(E) 148; Node(F) 150; and Node(G) 152), Node(D) 146 as a significant node in the organization's network.

At operation 540, the process includes determining a particular action to be performed with respect to the at least one significant node identified in the network. For example, referring to FIG. 1, the network action component(s) 120 may be configured to determine a particular action to be performed with respect to Node(D) 146 of the organization's network. As described herein, illustrative, non-limiting examples of actions to be performed may include: prioritizing patching or monitoring of Node(D) 146; establishing alert mechanisms to trigger when particular conditions are satisfied for Node(D) 146; informing changes to the network structure of the organization's network; or informing an intrusion detection system associated with the organization's network of where to focus particular attention.

Thus, FIG. 5 illustrates an example of a process of implementing a graph-analysis based assessment to determine relative node significance, according to some embodiments. In contrast to conventional approaches that rely on human inputs to identify important assets of an organization, the example process depicted in FIG. 5 utilizes objectively observable network structures and flows to identify particular assets that have a relatively high disruption potential for the organization.

FIG. 6 is a block diagram illustrating an example computer system 600 that is used to implement one or more portions of a system that implements a graph analysis-based assessment to determine relative node significance, according to some embodiments. For example, the computer system 600 may be a server that implements one or more components of the computing resource(s) 110 of FIG. 1.

Computer system 600 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 600 includes one or more processors 610, which may include multiple cores coupled to a system memory 620 via an input/output (I/O) interface 630. Computer system 600 further includes a network interface 640 coupled to I/O interface 630. In some embodiments, computer system 600 may be a uniprocessor system including one processor 610, or a multiprocessor system including several processors 610*a-n*, as shown. The processors 610 may be any suitable processors capable of executing instructions. For example, in various embodiments, processors 610 may implement one of a number of instruction set architectures (ISAs), such as the x86, PowerPC, SPARC, or MIPS ISA.

As shown, the computer system 600 may also include one or more network communication devices (e.g., network interface 640) for communicating with other systems and/or components over a communications network. For example, an instance of an application executing on computer system 600 may use network interface 640 to communicate with another server application executing on another computer system, as described herein.

As shown, computer system 600 may use its network interface 640 to communicate with one or more other devices 660, such as persistent storage devices and/or one or more I/O devices. In some embodiments, some of these other devices may be implemented locally on the computer system 600, accessible via the I/O interface 630. In various embodiments, persistent storage devices may include disk drives, tape drives, solid state memory, other mass storage devices, or any other persistent storage device. The computer system 600 may store instructions and/or data in persistent storage devices, and retrieve the stored instruction and/or data as needed.

As shown, the computer system 600 may include one or more system memories 620 that store instructions and data accessible by processor(s) 610. In various embodiments, system memories 620 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 620 may be used to store code 625 or executable instructions to implement the methods and techniques described herein. For example, the executable instructions may include instructions to implement network traffic data collector 112, the network node identifier 114, the network node centrality evaluator 116, and the network action component(s) 120, as discussed. The system memory 620 may also be used to store data 626 needed or produced by the executable instructions. For example, the in-memory data 626 may include portions of the results data store 118, as discussed.

In some embodiments, some of the code 625 or executable instructions may be persistently stored on the computer system 600 and may have been loaded from external storage media. The persistent storage of the computer system 600 and the external media are examples of non-transitory computer-readable storage media, which may be used to store program instructions to be executed by the computer system 600. A non-transitory computer-readable storage medium may provide the capability to store information in a form readable by a machine (e.g., computer system 600). Non-transitory computer-readable media may include storage media such as magnetic or optical media, disk or DVD/CD-ROM devices, archival tapes, network-attached storage systems, or other computer systems.

In some embodiments, the I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

In some embodiments, the network interface 640 may allow data to be exchanged between computer system 600 and other devices attached to a network. The network interface 640 may also allow communication between computer system 600 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). In some embodiments, the network interface 640 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:

one or more hardware processors with associated memory that implement an intrusion detection system (IDS), configured to:

monitor network traffic data in a network;

perform a graph analysis-based assessment of the network, comprising:

determining, based at least in part on the network traffic data, a graph of network traffic paths among a plurality of nodes in the network; and calculating, based at least in part on the graph, centrality values for individual ones of the plurality of nodes, wherein a centrality value of a given node comprises a betweenness centrality value that indicates a number of shortest paths between two other nodes in the graph that traverses through the given node;

identify, based at least in part on the graph and the centrality values, a significant node in the network, wherein the significant node is determined to be, compared to other nodes of the network, a greater source of potential harm to the network if the significant node is attacked or infected; and in response to the identification of the significant node, cause the significant node to be to be prioritized for intrusion detection monitoring and vulnerability patching.

2. The system of claim 1, wherein the centrality values include at least three different types of centrality values for individual nodes, including an undirected centrality value, an in-degree centrality value, and an out-degree centrality value.

3. The system of claim 1, wherein the significant node is identified without accounting for intrinsic attributes of the significant node, including: users who use the significant node, and a node type of the significant node.

4. The system of claim 3, wherein the significant node is identified without accounting for intrinsic attributes of peer nodes connected to the significant node in the graph.

5. The system of claim 1, wherein the significant node is identified based on a sensitivity type of information stored or received by the significant node.

6. The system of claim 1, wherein the centrality value of the given node is dependent on an amount of traffic flow through the given node relative to other nodes in the network.

7. The system of claim 1, wherein the centrality values include an Eigenvector centrality value.

8. The system of claim 1, wherein information generated by the graph analysis-based assessment is used to establish an alert mechanism for the network.

9. The system of claim 8, wherein the alert mechanism is established based on user input received via a user interface, wherein the user interface displays one or more of the centrality values.

10. The system of claim 1, wherein information concerning the identification of the significant node is used by a vulnerability management system to perform one or more actions with respect to the significant node, to:

adjust when the significant node can be taken offline for patching, implement stricter network segmentation in the network to protect the significant node, or add firewall to protect the significant node.

11. A method comprising:

executing an intrusion detection system (IDS) implemented by one or more hardware processors with associated memory, comprising:

determining, based at least in part on the network traffic data, a graph of network traffic paths among a plurality of nodes in the network;

calculating, based at least in part on the graph, centrality values for individual ones of the plurality of nodes, wherein a centrality value of a given node comprises a betweenness centrality value that indicates a number of shortest paths between two other nodes in the graph that traverses through the given node;

identifying, based at least in part on the graph and the centrality values, a significant node in the network, wherein the significant node is determined to be, compared to other nodes of the network, a greater source of potential harm to the network if the significant node is attacked or infected; and in response to the identification of the significant node, causing the significant node to be to be prioritized for intrusion detection monitoring and vulnerability patching.

12. The method of claim 11, wherein the centrality values include at least three different types of centrality values for individual nodes, including an undirected centrality value, an in-degree centrality value, and an out-degree centrality value.

13. The method of claim 11, wherein the centrality values include an Eigenvector centrality value.

14. The method of claim 13, wherein the significant node is identified without accounting for intrinsic attributes of peer nodes connected to the significant node in the graph.

15. The method of claim 11, wherein the significant node is identified based on a sensitivity type of information stored or received by the significant node.

16. The method of claim 11, wherein the centrality value of the given node is dependent on an amount of traffic flow through the given node relative to other nodes in the network.

17. The method of claim 11, wherein the prioritized monitoring of the significant node enables the IDS to detect anomalous network behavior of a peer node connected to the significant node in the graph without directly monitoring the peer node.

18. The method of claim 11, wherein information generated by the graph analysis-based assessment is used to establish an alert mechanism for the network.

19. The method of claim 18, wherein the alert mechanism is established based on user input received via a user interface, wherein the user interface displays one or more of the centrality values.

20. The method of claim 11, wherein information concerning the identification of the significant node is used by a vulnerability management system to perform one or more actions with respect to the significant node, to:

adjust when the significant node can be taken offline for patching, implement stricter network segmentation in the network to protect the significant node, or add a firewall to protect the significant node.

* * * * *